United States Patent
Ina et al.

(10) Patent No.: US 6,391,099 B1
(45) Date of Patent: May 21, 2002

(54) SCRUBBING DUST COLLECTOR AND EXHAUST GAS TREATMENT INSTALLATION

(75) Inventors: Hidekazu Ina; Hideji Kawanaka, both of Kalogun (JP)

(73) Assignee: L'air Liquide, Societe Anonyme pour l'etude et l'Exploitation des Procedes Georges Claude, Paris (FR)

(*) Notice: Subject to any disclaimer, the term of this patent is extended or adjusted under 35 U.S.C. 154(b) by 0 days.

(21) Appl. No.: 09/532,887

(22) Filed: Mar. 22, 2000

(30) Foreign Application Priority Data

Mar. 29, 1999 (JP) .......................................... 11-086385

(51) Int. Cl.[7] .......................... B01D 47/10; B01D 53/14
(52) U.S. Cl. ............................. 96/275; 96/323; 96/363; 261/DIG. 54
(58) Field of Search .................... 261/DIG. 54; 96/240, 96/270, 273, 275, 277, 323, 322, 363, 362, 361; 95/216, 217

(56) References Cited

U.S. PATENT DOCUMENTS

| | | | | |
|---|---|---|---|---|
| 2,983,332 A | * | 5/1961 | Vicard ................. | 261/DIG. 54 |
| 3,339,344 A | * | 9/1967 | Pallinger ............. | 261/DIG. 54 |
| 3,406,953 A | * | 10/1968 | Moore ................ | 261/DIG. 54 |
| 3,448,562 A | * | 6/1969 | Wisting .............. | 261/DIG. 54 |
| 3,613,333 A | * | 10/1971 | Gardenier ............ | 96/278 |
| 4,411,846 A | * | 10/1983 | Ulrich et al. ........ | 261/DIG. 54 |
| 4,469,493 A | * | 9/1984 | Tuovinen et al. ..... | 261/DIG. 54 |

* cited by examiner

*Primary Examiner*—Duane S Smith
(74) *Attorney, Agent, or Firm*—Burns, Doane, Swecker & Mathis, L.L.P.

(57) ABSTRACT

An improved scrubbing dust collector and exhaust gas treatment installation are described. The collector (2) includes a tank (21) containing a washing liquid, a scrubbing tower (22) on the upper portion of the tank into which an exhaust gas is introduced, a jetting nozzle (25) on the upper portion of the tower, and at least one netting member (42) located in a lower portion of the tower. The netting may be installed in a frame (40) which has slits therein. A plurality of netting members may be employed and a lower member may have a smaller mesh size than an upper one. The installation includes the scrubbing dust collector (2), a combustor (1) and a separator tower (23). As washing liquid is jetted from the nozzle (25), it passes downward in the scrubbing tower and forms a membrane-like layer on the netting member thereby providing a larger contact area between the exhaust gas and the washing liquid.

11 Claims, 3 Drawing Sheets

SCRUBBING DUST COLLECTOR AND EXHAUST GAS TREATMENT INSTALLATION

This application claims priority under 35 U.S.C. §§119 and/or 365 to 86 385/1999 filed in Japan on Mar. 29, 1999; the entire content of which is hereby incorporated by reference.

BACKGROUND OF THE INVENTION

1. Field of the Invention

The present invention relates to a scrubbing dust collector for subjecting an exhaust gas from discharged from a semiconductor-manufacturing unit or the like to scrubbing and dust-collection, and relates to an exhaust gas treatment installation comprising this scrubbing dust collector.

2. Description of the Related Art

In the manufacture of semiconductors, an exhaust gas containing poisonous gases such as silane gas is produced. Therefore, it is obliged in accordance with a low (High pressure gas control low) to install, in a place where such an exhaust gas is discharged, an exhaust gas treatment installation, and to discharge the exhaust gas after the poisonous gases are made harmless.

As an exhaust gas treatment installation of the prior art, there has been used, for instance, one comprising a combustor for burning an exhaust gas and a jet type scrubbing dust collector for subjecting the exhaust gas burned in this combustor to scrubbing and dust-collection. In a case where a removal treatment of, for example, silane gas ($SiH_4$) contained in an exhaust gas is carried out in such an exhaust gas treatment installation, said exhaust gas is first reacted with oxygen in air by the combustor and a combustion exhaust gas containing the resulting particles ($SiO_2$) is mixed with cooling air so as to be cooled down to about 80° C. By contacting the exhaust gas with a washing liquid (in general, water) by use of the scrubbing dust collector, $SiO_2$ is thereafter caught in the washing liquid, and namely $SiO_2$ is removed from the exhaust gas.

In the aforementioned prior art, however, there has been such a problem that it is very difficult to catch fine dust particulates whose diameter is as small as 0.1~0.5 micron, of dust particulates contained in an exhaust gas, by a circulating washing liquid so that the same fine dust particulates are permitted to be directly released to the atmosphere.

It is an object of the present invention to provide a scrubbing dust collector and an exhaust gas treatment installation capable of catching fine dust particulates in an exhaust gas by a washing liquid, thereby decreasing dust particulates released to the atmosphere.

SUMMARY OF THE INVENTION

In order to achieve the aforementioned purpose, the invention of the first aspect provides a scrubbing dust collector comprising a washing liquid tank containing a washing liquid stored therein, and a scrubbing tower provided on the upper portion of said washing liquid tank and having a washing liquid jetting means for jetting said washing liquid, where an exhaust gas is introduced into said scrubbing tower so as to be subjected to scrubbing and dust-collection, characterized in that a netting member is provided below said washing liquid jetting means in said scrubbing tower.

By virtue of the provision of the netting member, as mentioned above, a washing liquid jetted from the washing liquid jetting means collects temporarily in a section of the netting member so that a liquid membrane is formed. When the washing liquid passes through the meshes of the netting member, the same washing liquid falls down as it packs the exhaust gas, and hence the contact area of the exhaust gas containing fine dust particulates with the washing liquid becomes larger, whereby the fine dust particulates are easily caught in the washing liquid. Accordingly, the fine dust particulates removed from the exhaust gas increase, and as a result, dust particulates released to the atmosphere decrease.

In the aforementioned scrubbing dust collector, a plurality of the netting members are preferably disposed vertically. Even if fine dust particulates contained in the exhaust gas are not caught in the washing liquid in a section of the netting member on the upper side, owing to this construction, they will be caught in the washing liquid in a section of the netting member on the lower side. Namely, fine dust particulates are surely removed from the exhaust gas and dust particulates released to the atmosphere further decrease.

In this case, the mesh size of the netting member on the lower side is preferably made smaller than that of the netting member on the upper side. Owing to this construction, dust particulates of a so-called group of cluster particles formed by combining a plurality of fine dust particulates whose diameter is for example as small as 0.1 micron, of dust particulates contained in an exhaust gas, are caught by the washing Liquid in a section of the netting member on the upper side, and fine dust particulates as simple substances will be caught by the washing liquid in a section of the netting member on the lower side. Accordingly, fine dust particulates are removed from the exhaust gas, with an excellent efficiency.

Further, a frame body having slits formed therein is preferably provided below said washing liquid jetting means in said scrubbing tower, and said netting members are preferably attached below said slits in said frame body. If the quantity of the washing liquid collecting in a section of the netting members becomes larger, owing to this construction, the washing liquid will be discharged out of the frame body through said slits.

By attaching an ultrasonic vibrator on said frame body, furthermore, the clogging of the netting members can be prevented, and at the same time the fine dust particulates-collecting efficiency can be improved.

In order to achieve the aforementioned purpose, the invention of the second aspect provides an exhaust gas treatment installation comprising a combustor for burning an exhaust gas and the aforementioned scrubbing dust collector for subjecting the exhaust gas burned in this combustor to scrubbing and dust-collection. Owing to this construction, fine dust particulates removed from an exhaust gas increase and hence dust particulates released to the atmosphere decrease, as mentioned above.

DETAILED DESCRIPTION OF THE PREFERRED EMBODIMENTS

Referring to the accompanying drawings, a preferred embodiment of the present invention will be described in detail.

Figure 1:
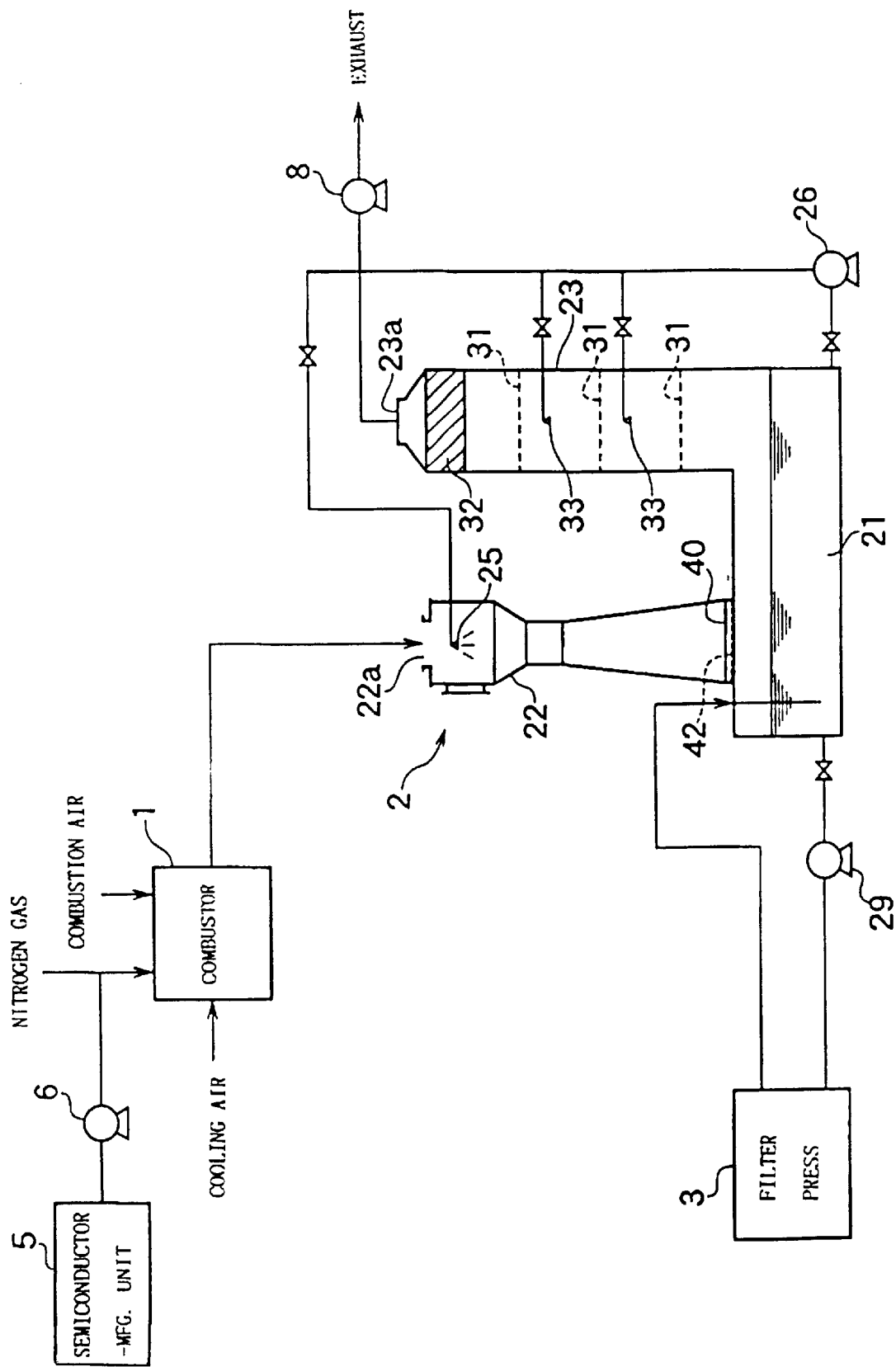
FIG. 1 is a block flow diagram showing an embodiment of the exhaust gas treatment installation including the scrubbing dust collector according to the present invention.

FIG. 1 is a block flow diagram showing one embodiment of the exhaust gas treatment installation according to the present invention. In the same drawing, the exhaust gas treatment installation of this embodiment comprises a combustor 1 equipped with a flame tube for burning an exhaust gas discharged from a semiconductor-manufacturing unit 5 such as CVD unit or etching unit and containing monosilane gas ($SiH_4$), a jet type scrubbing dust collector 2 for contacting the exhaust gas discharged from said combustor 1 with a circulating washing liquid, this is circulating water, to collect $SiO_2$ which is powders contained in the exhaust gas, and a filter press 3 for separating the powders from the circulating water.

The combustor 1 is constructed such that the exhaust gas from the semiconductor-manufacturing unit 5 and combustion air are introduced therein, and in the flame tube, $SiH_4$ contained in the exhaust gas is reacted with oxygen in the air at a high temperature to produce $SiO_2$. Since $SiH_4$ contained in the exhaust gas has a relatively higher concentration, in addition, it is designed to introduce the exhaust gas into the combustor 1 after it is optionally diluted with nitrogen gas. In the combustor 1, cooling air is further introduced therein to cool down the exhaust gas which has got a high temperature in the flame tube, and the cooled exhaust gas is then discharged.

The scrubbing dust collector 2 comprises a water tank 21 containing circulating water stored therein, a scrubbing tower 22 provided on the upper portion of said water tank 21 and having at its top portion an exhaust gas inlet port 22a connected with the combustor 1, and a separator tower 23 provided adjacently to the scrubbing tower 22 on the upper portion of said water tank 21 and having at its top portion an exhaust port 23a connected with an exhaust blower 8.

Figure 2:
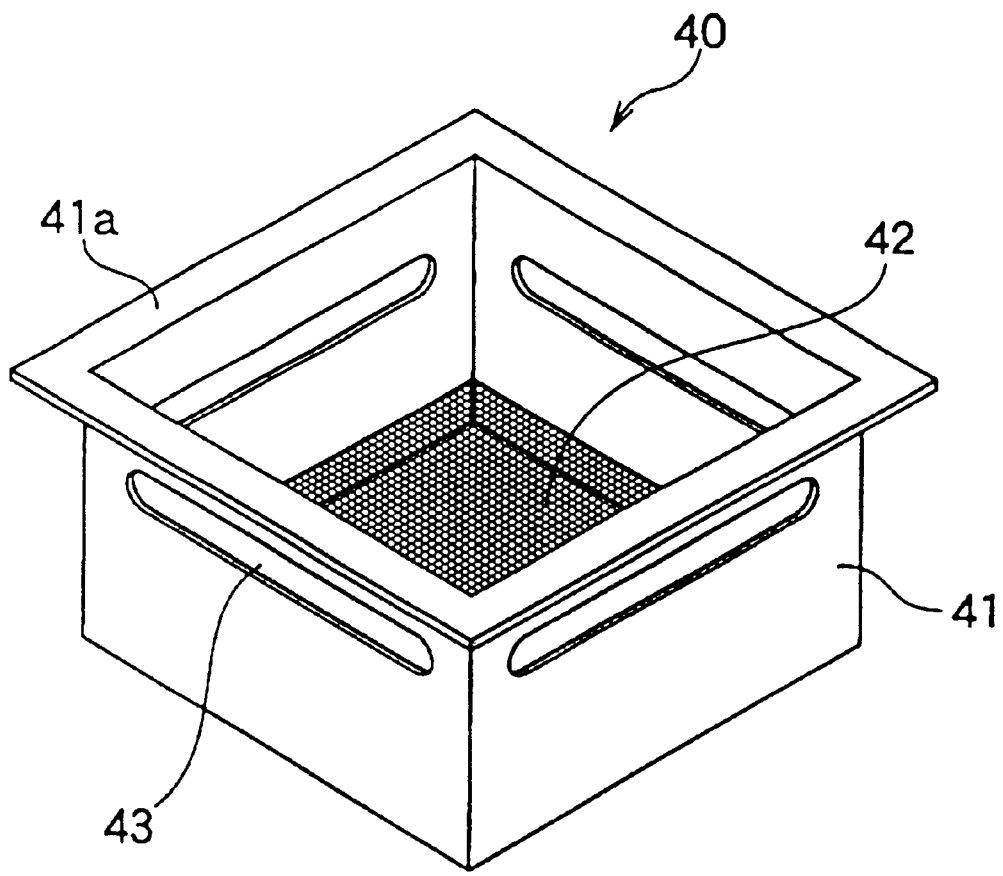
FIG. 2 is a perspective view showing the circulating water hold member illustrated in FIG. 1.

In the upper portion of the scrubbing tower 22 is installed a nozzle 25 as the washing liquid jetting means. This nozzle 25 is connected with the water tank 21 by way of a circulation pump 26, where the circulating water sucked up from the water tank 21 by the circulation pump 26 is radially jetted downwards. Further, in the lower portion of the scrubbing tower 22 is installed a circulating water hold member 40 having a wire mesh plate 42 which is a stainless steel-made netting member for interrupting the circulating water jetted from the nozzle 25. The structure of this circulating water hold member 40 is illustrated in FIG. 2.

In the same drawing, the circulating water hold member 40 comprises a square frame body 41 having a flange part 41a provided at its upper end. Four walls which form this frame body 41 each has a slit 43 formed as an escape hole for the circulating water. In the lower portion of the frame body 41, the said wire mesh plate 42 is detachably attached. This wire mesh plate 42 is shaped in the form of a lattice, and the mesh size thereof is made to be such a size that the circulating water released from the nozzle 25 can remain only in a sufficient amount for collecting $SiO_2$ in the exhaust gas, for example 30~80 meshes. The term "mesh" used here is a unit represented by the number of meshes (the common ratio=$2^{1/2}$) contained in 1 $in^2$. In the circulating water hold member 40 having such a structure as mentioned above, the flange part 41a of the frame body 41 is fixed on a plurality of attachment frames (not shown) provided on the inner surface of the wall part of the scrubbing tower 22 by means of bolts or the likes.

Now returning to FIG. 1, the separator tower 23 has Raschig ring trays 31 disposed in plural stages (in three stages in the drawing) and a separator 32 disposed above these Raschig ring trays 31. The Raschig ring trays 31 each is designed to further remove dust particulates in a small amount remaining in a rising gas by the circulating water jetted from a nozzles 33, and the separator 32 is also designed to eliminate water drops contained in the gas freed of dust particulates.

The filter press 3 is connected with the water tank 21 by way of a suction pump 29, where the circulating water containing dust particulates in the water tank 21 is introduced therein by the suction pump 29 and the same circulating water is freed of dust particulates and then returned to the water tank 21.

In the next place, a treatment of monosilane gas ($SiH_4$) using the exhaust gas treatment installation of this embodiment constructed as mentioned above will be described here.

By actuating the exhaust pump 6 at first, an exhaust gas containing at a high concentration $SiH_4$ which has been discharged from the semiconductor-manufacturing unit 5 is diluted with nitrogen gas and then introduced into the flame tube of the combustor 1. Into this flame tube, combustion air is also introduced. In the flame tube, $SiH_4$ contained in the exhaust gas is reacted with oxygen in the air and as a result, $SiO_2$ is produced. A combustion exhaust gas containing this $SiO_2$ is then cooled down to about 80° C. by cooling air. Thereafter, the exhaust gas containing $SiO_2$ is sent from the combustor 1 to the scrubbing tower 22 of the scrubbing dust collector 2 by means of the exhaust blower 8.

The exhaust gas introduced in the scrubbing tower 22 is subjected to scrubbing and dust-collection by contacting $SiO_2$ contained therein with the circulating water jetted from the nozzle 25. $SiO_2$ powders include fine dust particulates whose diameter is as small as about 0.1 micron and dust particulates of a group of cluster particles formed by combining (combining to cluster) a plurality of these fine dust particulates. As to fine dust particulates as simple substances and dust particles of a group of cluster particles whose diameter is small (i.e. less than 0.5 micron in diameter), both of which will be hereinafter called fine dust particulates en bloc, of these dust powders, they seldom collide with the circulating water while falling down because the contact area of them with the circulating water jetted from the nozzle 25 is small, and it is namely difficult to catch fine dust particulates only by the circulating water as falling down.

Since the wire mesh plate 42 is provided in the lower portion of the scrubbing tower 22, in this embodiment, the circulating water jetted from the nozzle 25 spreads in a section of the wire mesh plate 42 so that a liquid membrane is formed. The contact area of the exhaust gas containing $SiO_2$ with the circulating water therefore becomes larger, whereby $SiO_2$ is easily caught in the circulating water. When the circulating water which has temporarily collected in a section of the wire mesh plate 42 falls down through the meshes of the wire mesh plate 42, the same circulating water falls down as it packs the exhaust gas, and hence the contact area of the exhaust gas with the circulating water becomes larger, whereby $SiO_2$ in the exhaust gas is easily caught in the circulating water.

The circulating water which has caught $SiO_2$ is sent to the filter press 3 by way of the suction pump 29, where $SiO_2$ is removed therefrom by the filter press 3. The gas freed of $SiO_2$ is then sent to the separator tower 23 through the upper portion of the water tank 21 by means of the exhaust blower 8. After a small amount of dust particulates remaining in the rising gas are removed by the circulating water jetted from the nozzles 33 in a section of the Raschig ring trays 31 and water drops contained in the gas are removed by the separator 32, the same gas will be released to the atmosphere by way of the exhaust blower 8.

According to this embodiment, as mentioned above, the circulating water hold member 40 having the wire mesh plate 42 has been installed in the scrubbing tower 22 so that the exhaust gas containing dust particulates and the circulating water are sufficiently contacted with each other, and hence even fine dust particulates in the exhaust gas can be surely caught in the circulating water, whereby the dust particulates can be prevented from being released to the atmosphere.

In this embodiment, further, the slits 43 have been formed in the frame body 41 of the circulating water hold member 40, and hence when the quantity of the circulating water which collects in a section of the wire mesh plate 42 becomes much more than as needed, the circulating water will be discharged outside of the frame body 41 through the slits 43.

Figure 3:
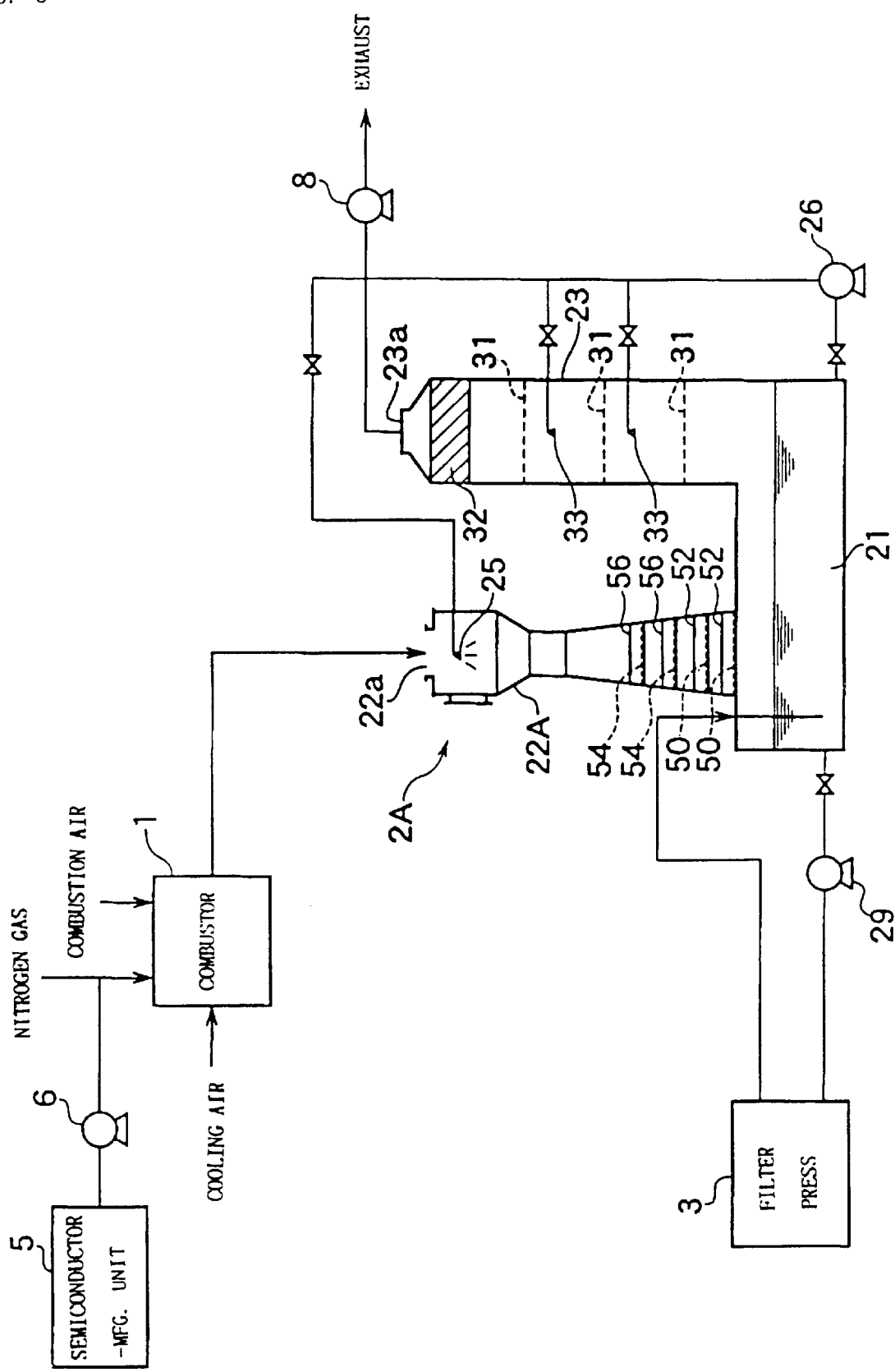
FIG. 3 is a block flow diagram showing another embodiment of the exhaust gas treatment installation including the scrubbing dust collector according to the present invention.

Although one wire mesh plate 42 has been provided in the scrubbing tower 22, moreover in this embodiment, the number of the wire mesh plates 42 may be plural. Referring to FIG. 3, another embodiment using a plurality of the wire mesh plates will be described. In this drawing, members which are the same as or equal to those in the aforementioned embodiment of FIG. 1 will be given the same numerals and their explanation will be omitted.

In the embodiment depicted in FIG. 3, four wire mesh plates are provided in a scrubbing tower 22A in a scrubbing dust collector 2A. Describing further in detail, in the lower portion of the scrubbing tower 22A are provided two circulating water hold members 52, each having the wire mesh plate 50, and above these circulating water hold members 52 are provided two circulating water hold members 56, each having the wire mesh plate 54 whose mesh is more rough than that of the wire mesh plates 50. These circulating water hold members 52, 56 each is constructed similarly to the circulating water hold member 40 shown in FIG. 2 such that the wire mesh plates 50, 54 are detachably attached on the bottom surface portion of a square frame body. The mesh size of the wire mesh plates 50 is made to be an optimum size for catching dust particulates having a particle unit, for example 50~80 meshes, and the mesh size of the wire mesh plates 54 is made to be an optimum size for catching dust particulates of a cluster particle group, for example 30~50 meshes. The other constructions are the same as those illustrated in FIG. 1.

In the scrubbing dust collector 2A having such a construction as mentioned above, dust particulates of a group of cluster particles, of $SiO_2$ contained in an exhaust gas, are caught in the circulating water in a section of the wire mesh plates 54, and fine dust particulates which have been not caught in this section are caught by the circulating water in a section of the wire mesh plates 50. Accordingly, a scrubbing dust collection excellent in efficiency is carried out.

Although it has been constructed that the frame body is installed on the wall portion of the scrubbing tower and the wire mesh plates are detachably attached on this frame body, in these two aforementioned embodiments, it may be constructed that the wire mesh plates are detachably attached on the wall portion of the scrubbing tower, without using such a frame body.

Although it has been constructed that the wire mesh plates are installed as the netting members in the scrubbing tower, plastic net plates or others may be used as the netting members, not limited to the wire mesh plates.

Although the removal treatment of $SiO_2$ produced by burning an exhaust gas containing monosilane gas ($SiH_4$) has been described above, the present invention is applicable to a removal treatment of other dust particulates contained in an exhaust gas, not limited to $SiO_2$. Also in this case, it is necessary to set the mesh size of the netting members in proportion to dust particulates to be removed.

According to the present invention, the netting members are provided in the scrubbing tower, and hence an exhaust gas containing fine dust particulates and a circulating washing liquid are sufficiently contacted with each other, whereby fine dust particulates in the exhaust gas are surely caught in the washing liquid and dust particulates can be prevented from being released to the atmosphere.

What is claimed is:

1. A scrubbing dust collector comprising:
   a washing liquid tank containing a washing liquid stored therein;
   a scrubbing tower provided on the upper portion of said washing liquid tank and having a washing liquid jetting means for jetting said washing liquid, whereby an exhaust gas introduced into said scrubbing tower is subjected to scrubbing and dust collection;
   at least one netting member provided in a lower portion of said scrubbing tower to enhance removal of dust particulates from the exhaust gas; and
   a frame body having slits therein provided in a lower portion of said scrubbing tower, the said at least one netting member located in the frame body below said slits.

2. A scrubbing dust collector according to claim 1, in which a plurality of said netting members are vertically disposed.

3. A scrubbing dust collector according to claim 2, in which the mesh size of the netting members on the lower side is made smaller than that of the netting members on the upper side.

4. A scrubbing dust collector according to claim 1, in which said frame body has a vibrator attached thereon.

5. An exhaust gas treatment installation comprising a combustor for burning an exhaust gas and a scrubbing dust collector according to claim 1 for subjecting the exhaust gas burned in this combustor to scrubbing and dust-collection.

6. An exhaust gas treatment installation comprising a combustor for burning an exhaust gas and a scrubbing dust collector according to claim 2 for subjecting the exhaust gas burned in this combustor to scrubbing and dust-collection.

7. An exhaust gas treatment installation comprising a combustor for burning an exhaust gas and a scrubbing dust collector according to claim 3 for subjecting the exhaust gas burned in this combustor to scrubbing and dust-collection.

8. An exhaust gas treatment installation comprising a combustor for burning an exhaust gas and a scrubbing dust collector according to claim 4 for subjecting the exhaust gas burned in this combustor to scrubbing and dust-collection.

9. A scrubbing dust collector according to claim 1, wherein the exhaust gas is discharged from a semiconductor manufacturing unit.

10. An exhaust gas treatment installation according to claim 5, which further includes a separator to remove remaining dust particulates and washing liquid from said exhaust gas.

11. A scrubbing dust collector comprising:
   a washing liquid tank containing a washing liquid stored therein;
   a scrubbing tower provided on the upper portion of said washing liquid tank and having a washing liquid jetting means for jetting said washing liquid, whereby an exhaust gas introduced into said scrubbing tower is subjected to scrubbing and dust collection;

a plurality of netting members provided below said washing liquid jetting means in said scrubbing tower to enhance removal of dust particulates from the exhaust gas, wherein the mesh size of a netting member disposed on the lower side is smaller than that of a netting member disposed on the upper side.

* * * * *